United States Patent
Leblais

(10) Patent No.: US 7,121,595 B2
(45) Date of Patent: Oct. 17, 2006

(54) DEVICE FOR LEAKTIGHT COUPLING OF A TUBE TO A THREADED TUBULAR NOSE

(75) Inventor: Sebastien Leblais, Rennes (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 10/960,952

(22) Filed: Oct. 12, 2004

(65) Prior Publication Data
US 2005/0077728 A1    Apr. 14, 2005

(30) Foreign Application Priority Data
Oct. 10, 2003    (FR) ................................. 03 11877

(51) Int. Cl.
*F16L 25/00*    (2006.01)
(52) U.S. Cl. .................. 285/388; 285/387; 285/354
(58) Field of Classification Search ............... 285/388, 285/387, 354
See application file for complete search history.

(56) References Cited

U.S. PATENT DOCUMENTS

| | | | | |
|---|---|---|---|---|
| 2,154,526 A | * | 4/1939 | Parkerton | 285/355 |
| 2,340,732 A | * | 2/1944 | Bruno | 285/331 |
| 2,724,602 A | * | 11/1955 | Colwell | 285/123.12 |
| 2,781,207 A | * | 2/1957 | Detweiler et al. | 285/233 |
| 2,956,820 A | | 10/1960 | De Cenzo | |
| 2,971,781 A | * | 2/1961 | Torres | 285/233 |
| 3,002,771 A | * | 10/1961 | Chakroff | 285/145.4 |
| 3,791,680 A | * | 2/1974 | Cleare | 285/148.13 |
| 4,456,287 A | * | 6/1984 | Bisonaya | 285/281 |
| 6,508,493 B1 | * | 1/2003 | Guivarc'h | 285/354 |

FOREIGN PATENT DOCUMENTS

GB    944 539    12/1963

\* cited by examiner

*Primary Examiner*—David Bochna
(74) *Attorney, Agent, or Firm*—Young & Thompson

(57) ABSTRACT

A device for leaktight coupling of a tube to a tubular nose, the tube being provided with an outwardly-directed bead at a distance from its end, the tubular nose presenting an outside thread and including an inlet bore for defining a housing for an annular gasket and an annular gasket-retaining insert, the device including a nut having the tube passing therethrough and presenting an end inside thread for co-operating with the thread of the tubular nose and including a chamber behind the thread, the chamber terminating by a drive wall, and an axial drive collar removably placed between one of the flanks of the bead and the drive wall, the collar extending axially towards the end of the tube beyond the bead in the chamber to co-operate with the insert, slidable in its housing and shaped as a pusher for compressing the gasket between the bore and the tub.

7 Claims, 2 Drawing Sheets

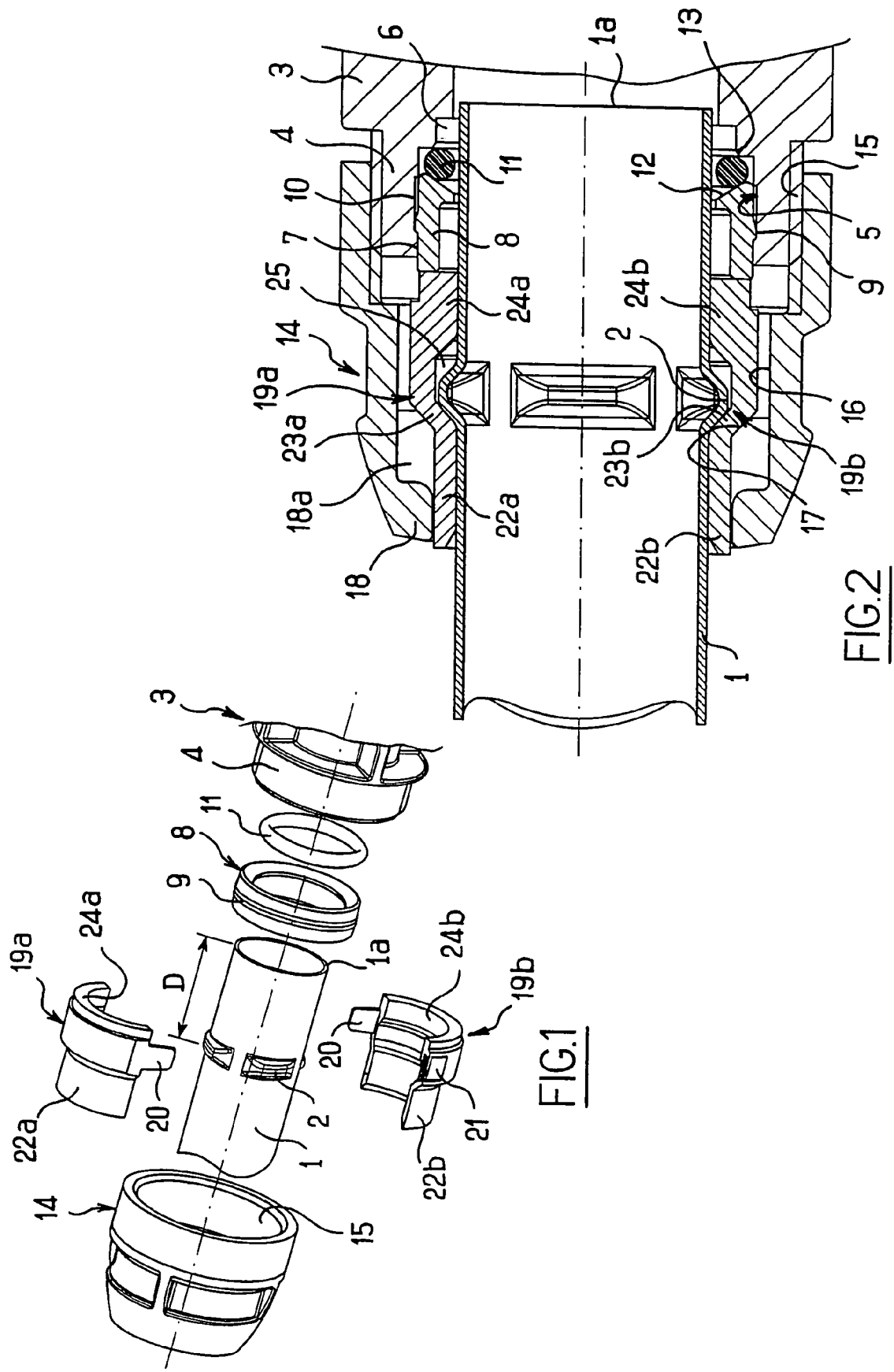

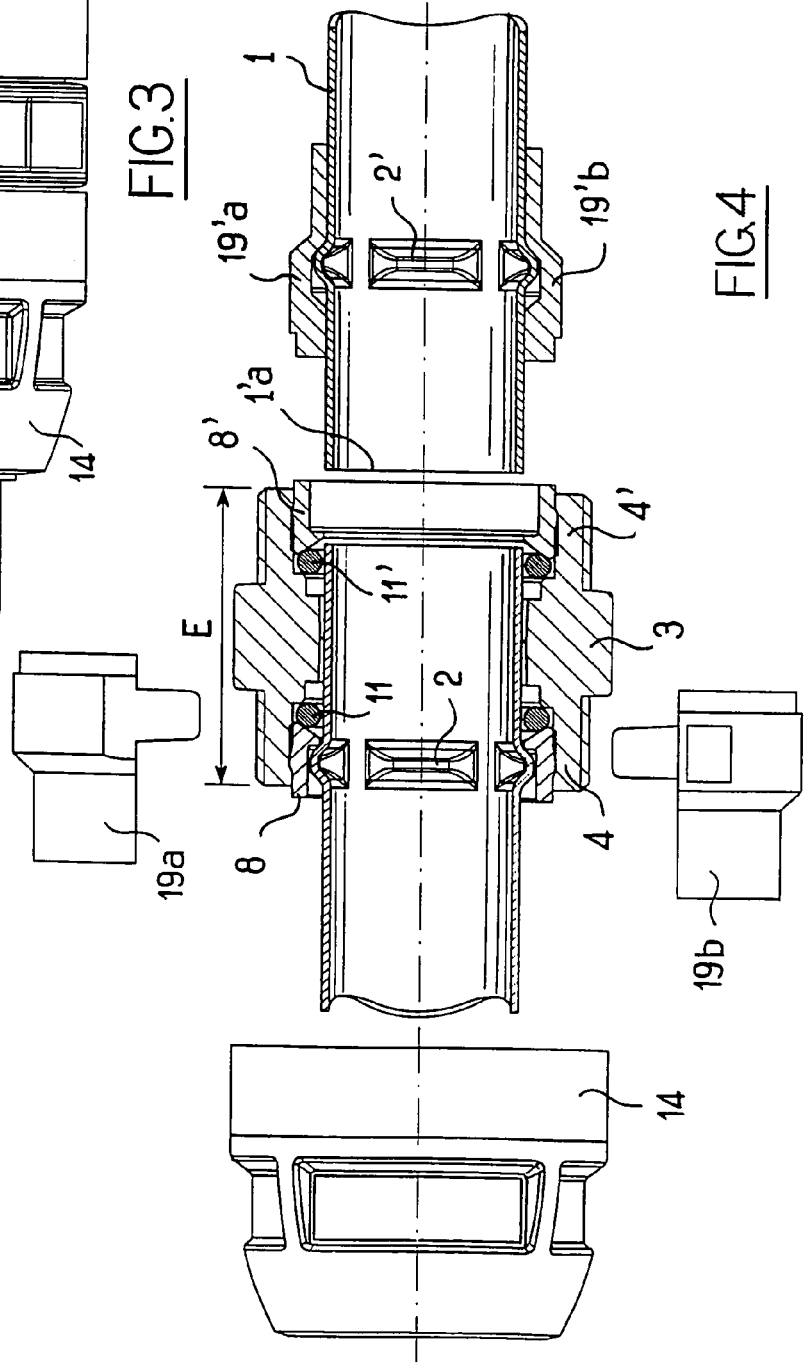

DEVICE FOR LEAKTIGHT COUPLING OF A TUBE TO A THREADED TUBULAR NOSE

The connection of a tube to a functional or connection member often makes use of a threaded tubular endpiece or nose belonging to said member, onto which a retaining nut of the tube is screwed, which nut co-operates, for example, with an outwardly-directed bead on the tube so as to constitute an axial abutment, with a sealing member being provided between a recess in the nose and the outside surface of the tube.

BACKGROUND OF THE INVENTION

In general, that type of device requires the tubes that are used to be well calibrated, and above all well supported in the nose so that the connection can be made properly leaktight. That is why the use of such devices is restricted to tubes of relatively small diameter for which the ratio of thickness over diameter is fairly large. With larger diameters, endpieces are fitted to the ends of the tubes, where such endpieces are made separately, with manufacturing tolerances that are under better control. The cost of couplings of that kind is naturally more expensive, particularly because of the need for prior assembly of endpieces onto tubes. In addition, when making an installation in situ, for example an installation for distributing a compressed fluid, it is often necessary to adjust the length of the tubes in the installation. It is then necessary for a tube to be connectable in the state in which it is then to be found, with a minimum amount of work being done on its cut end. This work consists in forming a bead, or more generally peripheral projections, on the tube so as to provide means for preventing the tube from moving axially in the coupling. This work leads to the tube being deformed, which is harmful for the leaktightness of the coupling. Finally, it should also be observed that in all devices in the state of the art, the sealing ring that is put into place is often injured or taken away by the end of the tube for coupling while it is being inserted into the tubular nose.

OBJECT OF THE INVENTION

The coupling means of the invention are of a kind to make the connection simpler to implement and more reliable in operation, particularly in terms of leaktightness.

BRIEF DESCRIPTION OF THE INVENTION

Thus, the invention provides a device for leaktight coupling of a tube to a tubular nose, the tube being provided with an outwardly-directed bead at a distance from its end, the tubular nose presenting an outside thread and including an inlet bore for defining a housing for an annular gasket and an annular insert for retaining the gasket.

According to one of the main characteristics of the invention, the device comprises firstly a nut having the tube passing therethrough, the nut presenting an end inside thread to co-operate with the thread of the tubular nose and including a chamber behind the thread, the chamber being terminated going away therefrom by a drive wall, and comprises secondly an axial drive collar suitable for being removably placed between one flank of the bead on the tube and the drive wall of the nut, the collar extending axially towards the end of the tube beyond the bead in the above-mentioned chamber of the nut, firstly to co-operate with the insert which is slidable in its housing and is in the form of a pusher for compressing the gasket between the bore and the tube, and secondly to form a sleeve for supporting the tube between the tubular nose and the nut.

It will thus be understood that when the connection is made, axial retention of the tube in the tubular nose is provided in conventional manner and the gasket is forced to deform in a space that is defined firstly by the outside surface of the tube and secondly by one or more surfaces of the gasket housing belonging to the threaded nose (the radial surface and/or cylindrical surface), so as to be certain of creating continuous lines of sealing, even in the presence of deformation to the outside surface of the tube between the inside of the tube and the atmosphere. In addition, since the tube-support function is performed by the collar, the connection can be stiffened against bending stresses.

In a preferred embodiment of the invention, the drive collar comprises two identical half-collars, each possessing complementary end means co-operating separably to reconstitute the collar.

Other embodiments of the collar are possible. For example, it can be made as a single piece of radially expandable material, such that the collar can be slid onto the tube from its end, and pass over the portion in relief on the tube because of this possibility of deforming radially, whether elastically or otherwise.

It is also possible to imagine that the bead is discontinuous and that the collar can be a single piece mounted on the tube astride the discontinuities of its projections like a bayonet coupling, with et collar being angularly indexed about the axis of the tube once it has gone past the bead.

For a collar made up of two half-collars, the end means of each half-collar are formed by a tongue and a notch that co-operate by friction in the circumferential direction of the collar.

Also in a preferred embodiment of the invention, the pusher is mounted to be slidable while being held captive axially in the bore of the nose which receives it. This constitutes a functional unit formed by the threaded nose, the pusher, and the gasket retained inside the tubular nose.

The outside diameter of the collar, at its end facing towards the pusher, is no greater than the diameter of the bore of the nose, in which the pusher slides. This disposition enables the collar to penetrate inside the bore whose wall constitutes a kind of tightening hoop about the collar while also providing radial support therefor. Thus, each half-collar forms a tube support cradle on either side of the bead, thereby improving guidance of the tube in the coupling and providing radial support enabling the tube to be substantially set in the coupling, thus enabling it to withstand the deformations that might arise due to the tube bending outside the coupling. This ability to withstand deformation helps ensure that good sealing is maintained for the coupling.

Under such circumstances, each cradle of each half-collar is axially spaced apart from the other by a groove for receiving the bead, where the groove is of a width in the axial direction that is greater than the width of the bead as measured in the same direction. This makes it possible, by axial sliding, to disengage the two half-collars from the bore of the nose in which the pusher slides, thus subsequently making it possible to separate them from each other and to disassemble completely the coupling between them, in the manner described below.

The flanks, or at least one of the flanks, of the bead of the tube is/are conical, as is the drive surface carried by the nut behind the chamber.

During clamping, this conical shape improves retention of the tube in the nose, concerning centering thereof, since the clamping force possesses a radially outward component.

In secondary manner, the invention also provides a double union using the device as described above and comprising a body provided with two opposite tubular noses of axial length such that when the body is in abutment against one or other of the beads on the tubes for connecting together, via the gasket compression pusher, the drive half-collars having been removed, the end of the tube equipped with the other bead is axially spaced apart from the free end of the body remote from the bead against which it comes into abutment. This dimensional characteristic makes it possible, when two tubes are united by a double union, to undo the coupling between these two tubes, to remove the body of the double union from one of the tubes so that the other tube can be withdrawn in a purely radial direction (fishplating).

Finally, the invention also provides a tube for connection by means of the device or of the double union as described above, in which the bead that the tube includes at a distance from its end is in the form of at least three circumferentially spaced-apart stampings in the wall of the tube.

The stampings can be made either in the factory or else on site by means of special pliers, of known type.

Other characteristics and advantages of the invention appear from the following detailed description of an embodiment.

BRIEF DESCRIPTION OF THE DRAWINGS

Reference is made to the accompanying drawings, in which:

FIG. 1 is an exploded view of all of the elements making up the coupling device of the invention;

FIG. 2 is a section view of the elements of FIG. 1, the coupling being premounted but not tightened;

FIG. 3 is an axial half-section showing a double union constituting an application of the coupling of the invention and shown in its tight state; and FIG. 4 shows the double union of FIG. 3 being disassembled, enabling one of the connected-together tubes to be withdrawn radially.

DETAILED DESCRIPTION OF THE INVENTION

In the figures, the tube 1 possesses an end 1a at a distance D from which it includes a bead 2 obtained by stamping the wall of the tube by means of suitable pliers. A functional connection member 3 is shown in part in FIG. 1 and possesses a tubular nose 4 with an outside thread and including an inlet bore 5. In the particular example shown in the figures, this inlet bore is in fact a stepped bore with a rear section 6 of smaller diameter than a front section 7 in which an insert 8 is slidably mounted. The insert 8 possesses an outer circular tooth 9 which is received by a groove 10 in the section 7 of the inlet bore, which groove is much wider than the circular tooth 9 so that the insert 8 is slidably mounted but is held captive in the section 7. An O-ring gasket 11 is housed in the free state in the portion of the section 7 of the bore 5 that is situated between the section 6 and the insert 8. This O-ring gasket 11 is designed to penetrate into the section 6 of the bore when, as described below, the insert 8 acts as a pusher and compresses the gasket 11 via the conical leading thrust face 12 of the insert, forcing the gasket to penetrate into the section 6 which is connected to the section 5 via a surface 13 that is likewise conical.

The coupling device of the invention includes a conventional nut 14 with a leading section provided with an inside thread 15 extended rearwards by a chamber 16 terminated by a drive surface 17, in this example of conical shape, and formed by discontinuous segments, the drive surface 17 being carried by the rear wall 18 of the nut through which the tube 1 can pass. With respect to this rear wall 18, it is specified that, in fact, it comprises flutes 18a that are closed rearwardly, thus defining a non-continuous surface 17, thereby lightening the nut 14.

Finally, the coupling device of the invention includes a drive collar formed by two identical portions 19a, 19b each thus constituting a half-collar. Each half-collar is placed astride the bead 2 and is united with the other half-collar by a set of tongues 20 and notches 21 that co-operate by friction in the circumferential direction of the collar. More precisely, each tongue 20 is of trapezoidal shape and penetrates into a notch 21 that is likewise trapezoidal, so that when the half-collars are forced against each other, the tongues 20 become jammed inside the notches 21, with the collar then being assembled by friction.

As shown in the drawings, each half-collar possesses a rear portion 22a, 22b which forms a cradle coming to press against the tube 1 beyond the bead 2, a conical wall portion 23a, 23b which is interposed between the rear flank of the bead 2 and the thrust surface 17 of the nut 14, and finally a front extension 24a, 24b extending towards the end 1a of the tube, and suitable for pressing against the end of the insert 8 remote from the conical surface 12 thereof. In preferred manner, each extension 24a, 24b also constitutes a cradle that comes to press against the portion of the tube 1 extending between its end 1a and the bead 2. The outside diameter of the portions 24a and 24b is no greater than the diameter of the section 7 of the bore 5 in the tubular nose so as to be capable of penetrating therein when the nut is tightened. Between the cradles, each half-collar includes a groove 25 for receiving the bead 2 and of width in the axial direction that is greater than the thickness of the bead in the axial direction so that the collar when enclosed on the tube is free to slide axially to a limited extent.

It should also be observed that the sections 15 and 16 of the nut 14 are of an inside diameter that is greater than the outside diameter of the collar.

FIG. 3 shows a portion of the above-described coupling device in its tightened state. It can be seen that in this state the collar 19a, 19b has pushed back the insert 8 which forms a pusher towards the section 6 of the bore 5 in the nose 4 of the member 3 so that the gasket 11 has been forced into said section in order to be certain of constituting a continuous line of contact with the tube 1, a continuous line of contact with the end radial surface of the section 8, and/or a continuous line of contact with the cylindrical surface of said section. It is therefore certain that a sealing barrier exists between the inside of the tube and the outside atmosphere. By comparing FIGS. 2 and 3, it will be understood that when the coupling means are not tightened (FIG. 2), the gasket is not in contact with the tube since the gasket is deliberately selected to have an inside diameter that is greater than the outside diameter of the tube. Thus, when the tube is inserted into the gasket, the gasket is not injured by the end 1a of the tube, which end is often sharp because it has been cut to size on site. There is therefore no longer any risk of said gasket being taken away by the end while it is being inserted.

In FIG. 3, the stress imparted to the gasket by the pusher 8 forces the gasket to deform, in particular outwardly so as to come into contact with the tube.

It can also be seen in FIG. 3 that in this embodiment the member 3 is constituted by the body of a double union which possesses two opposite noses 4 and 4, the nose 4' co-operating in entirely similar manner with coupling elements that are the same as those described above but for a segment of tube 1' that is provided with a bead 2'.

As can be seen in FIG. 3, and also in FIG. 4, the elements as described above are to be found with the same references, and with the "prime" symbol being added to the references relating to the connection to the tube 1'.

In FIG. 4, there is shown the double union in its state that allows the tube 1' to be withdrawn in a direction A extending transversely to its axis X, without it being necessary to move the tube parallel to said axis, where such movement can be prevented by means for connecting the other end of the tube 1'. To obtain this result, the body 3 of the double union is of an axial length E that satisfies the following requirements. When the tube 1' is disconnected from the tube 1, the two nuts 14, 14' are undone. The two half-collars 19a and 19b are extracted towards the nut 14, for example, from their engagement in the pusher 8 by sliding them over the tube 1 as is made possible by the width of the groove 25, by separating them, and then by withdrawing them, thus enabling the body 3 to be slid along the tube 1 until the pusher 8 comes into abutment against the bead 2. It should be observed that in this configuration the pusher 8 is made in tubular manner with an internal recess 8a of diameter greater than the outside diameter of the bead 2 so as to increase the sliding distance that is possible for the body 3 of the double union over the tube 1. In this position, the free end of the tubular nose 4' of the double union is set back axially from the end 1'a of the tube 1', so there is no longer any obstacle to moving the tube 1' radially relative to the tube 1 (fishplating).

What is claimed is:

1. A device for leaktight coupling of a tube to a tubular nose, the tube being provided with an outwardly-directed bead at a distance from its end, the tubular nose presenting an outside thread and including an inlet bore for defining a housing for an annular gasket, the device comprising:
   a nut having the tube passing therethrough, the nut presenting an end inside thread to co-operate with the thread of the tubular nose and including a chamber behind the thread, the chamber being terminated going away therefrom by a drive wall;
   an axial drive collar suitable for being removably placed between one flank of the bead on the tube and the drive wall of the nut; and
   an annular insert for retaining the gasket,
   wherein the insert is mounted slidably while being held captive axially in the bore of the nose that receives it and wherein the collar extends axially towards the end of the tube beyond the bead in the above-mentioned chamber of the nut, firstly to co-operate with the insert which is slidable in its housing and is in the form of a pusher for compressing the gasket between the bore and the tube, and secondly to form a sleeve for supporting the tube between the tubular nose and the nut, wherein the drive collar comprises two identical half-collars, each possessing complementary end means cooperating separably to reconstitute the collar.

2. A coupling device according to claim 1, wherein the end means are formed on each half-collar by a tongue and a notch that co-operate by friction in the circumferential direction of the collar.

3. A device according to claim 1, wherein each half-collar forms a cradle on either side of the bead for supporting the tube.

4. A device according to claim 3, wherein each cradle is axially separated from the other by a groove for receiving the bead, the width of the groove in the axial direction being greater than the width of the bead measured in the same direction.

5. A device according to claim 1, wherein the flanks of the bead of the tube are conical, as is the drive surface of the nut.

6. A device for leaktight coupling of a tube to a tubular nose, the tube being provided with an outwardly-directed bead at a distance from its end, the tubular nose presenting an outside thread and including an inlet bore for defining a housing for an annular gasket, the device comprising:
   a nut having the tube passing therethrough, the nut presenting an end inside thread to co-operate with the thread of the tubular nose and including a chamber behind the thread, the chamber being terminated going away therefrom by a drive wall;
   an axial drive collar suitable for being removably placed between one flank of the bead on the tube and the drive wall of the nut; and
   an annular insert for retaining the gasket,
   wherein the insert is mounted slidably while being held captive axially in the bore of the nose that receives it and wherein the collar extends axially towards the end of the tube beyond the bead in the above-mentioned chamber of the nut, firstly to co-operate with the insert which is slidable in its housing and is in the form of a pusher for compressing the gasket between the bore and the tube, and secondly to form a sleeve for supporting the tube between the tubular nose and the nut, wherein the outside diameter of the collar at its end facing towards the pusher is no greater than the diameter of the bore of the nose in which the pusher slides, and
   wherein, when the gasket is compressed in its housing by the pusher, the end of the pusher remote from the gasket is situated inside the nose.

7. A double union implementing a device for leaktight coupling of a tube to a tubular nose, the tube being provided with an outwardly-directed bead at a distance from its end, the tubular nose presenting an outside thread and including an inlet bore for defining a housing for an annular gasket, the device comprising:
   a nut having the tube passing therethrough, the nut presenting an end inside thread to co-operate with the thread of the tubular nose and including a chamber behind the thread, the chamber being terminated going away therefrom by a drive wall;
   an axial drive collar suitable for being removably placed between one flank of the bead on the tube and the drive wall of the nut; and
   an annular insert for retaining the gasket,
   wherein the insert is mounted slidably while being held captive axially in the bore of the nose that receives it and wherein the collar extends axially towards the end of the tube beyond the bead in the above-mentioned chamber of the nut, firstly to co-operate with the insert which is slidable in its housing and is in the form of a pusher for compressing the gasket between the bore and the tube, and secondly to form a sleeve for supporting the tube between the tubular nose and the nut and
   the union comprising a body provided with two opposite tubular noses of axial length such that when the body is in abutment against one or the other of the beads of the tubes for connection, via the gasket compression pusher, the end of the tube provided with the other bead is axially set back from the tubular nose remote from the bead against which the body comes into abutment.

* * * * *